(12) United States Patent
Bares et al.

(10) Patent No.: US 11,130,448 B2
(45) Date of Patent: Sep. 28, 2021

(54) FOLDING LADDER ASSEMBLY FOR AN ELEVATED PLATFORM

(71) Applicant: Caterpillar Paving Products Inc., Brooklyn Park, MN (US)

(72) Inventors: Brandon Bares, Becker, MN (US); Jason A. Haro, Dayton, MN (US); Nathan L. Mashek, Albertville, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 138 days.

(21) Appl. No.: 16/678,718

(22) Filed: Nov. 8, 2019

(65) Prior Publication Data

US 2021/0138961 A1 May 13, 2021

(51) Int. Cl.
*B60R 3/02* (2006.01)

(52) U.S. Cl.
CPC ..................... *B60R 3/02* (2013.01)

(58) Field of Classification Search
CPC .. B60R 3/02; B60R 3/007; B60R 9/06; E06C 1/381; E06C 7/082; E02F 9/0833; A01D 41/1261
See application file for complete search history.

(56) References Cited

U.S. PATENT DOCUMENTS

| 4,168,764 | A | * | 9/1979 | Walters | B63B 27/14 |
| | | | | | 182/1 |
| 6,068,277 | A | | 5/2000 | Magnussen | |
| 7,621,374 | B2 | * | 11/2009 | Richey | E04F 11/064 |
| | | | | | 182/77 |
| 9,194,180 | B2 | | 11/2015 | Hedley | |
| 9,447,638 | B2 | * | 9/2016 | Hedley | E06C 9/08 |
| 10,286,846 | B1 | | 5/2019 | Lindholm et al. | |
| 2013/0118832 | A1 | * | 5/2013 | Hedley | E06C 5/02 |
| | | | | | 182/106 |

* cited by examiner

*Primary Examiner* — Bryan A Evans
(74) *Attorney, Agent, or Firm* — Leydig, Voit & Mayer, LTD.

(57) ABSTRACT

Folding ladder assembly includes upper and lower ladder sections, and first, second, and third linkage assemblies. First linkage assembly includes at least a first linkage assembly linkage member. Second linkage assembly includes at least a second linkage assembly first linkage member pivotably coupled to upper and lower ladder sections. Third linkage assembly includes at least portions of the first linkage assembly linkage member and the second linkage assembly first linkage member. Movement of the first linkage assembly results in movement of the upper ladder section, the second linkage assembly, the third linkage assembly, and the lower ladder section.

20 Claims, 6 Drawing Sheets

FOLDING LADDER ASSEMBLY FOR AN ELEVATED PLATFORM

TECHNICAL FIELD

This patent disclosure relates generally to machines having an elevated, limited access platform and, more particularly to a handrail and ladder mechanism for accessing an elevated limited access platform in a mobile machine.

BACKGROUND

A variety of machines include elevated platforms, access to which may be provided by a ladder or stairs. Some of these handrails have a foldable design, allowing the handrails to move between an extended position and a retracted position. In some machine, particularly in mobile machines, it may be desirable to retract the ladder or stairs for safety reasons or to minimize a profile of the machine. Since handrails and ladders are typically the widest part of the machine determining the overall transport width. Further, in some machines, such as in cold planers or other similar machines that may be used in underground applications, ladders and handrails may need to be collapsed in order to prevent the collision of ladders and handrails with roadside barriers or obstructions.

In some such arrangements, retraction and extension of a ladder or stairs may be powered or partially power assisted, while in other arrangements, movement between extended and retracted positions may be an entirely manual operation. In some arrangements, retraction and extension may require intervention from more than one operator or assist from someone outside of the machine.

One example of an extendable ladder and platform is disclosed in U.S. Pat. No. 6,068,277, which discloses a platform, handrail, a ladder arrangement with an actuator in the form of a hydraulic cylinder. The platform and handrail arrangement pivotably mounted to the machine. The ladder is pivotably mounted to fold upon itself and against the underside of the platform when it is pivoted upwards.

SUMMARY

The disclosure describes, in one aspect, a folding ladder assembly adapted to be coupled to a machine. The folding ladder assembly includes an upper ladder section, a lower ladder section, and first, second, and third linkage assemblies. The first linkage assembly is coupled to the upper ladder section and adapted to be coupled to the machine, and includes at least a first linkage assembly linkage member. The second linkage assembly is coupled to the upper ladder section and the lower ladder section. The second linkage assembly is operable to move the lower ladder section relative to the upper ladder section. The second linkage assembly includes at least a second linkage assembly first linkage member pivotably coupled to the upper ladder section and pivotably coupled to the lower ladder section. The third linkage assembly includes at least a portion of the first linkage assembly linkage member and at least a portion of the second linkage assembly first linkage member. Movement of the first linkage assembly results in movement of the upper ladder section, the second linkage assembly, the third linkage assembly, and the lower ladder section.

According to another aspect of the disclosure, there is provided a retractable railing assembly and a folding ladder assembly adapted to be coupled to a machine. The retractable railing assembly includes at least one railing, and a railing linkage assembly adapted to movably couple the railing to the machine. The railing linkage assembly includes a machine attachment bracket adapted to be coupled to the machine, a railing bracket secured to the railing, and a pair of linkage members movably coupling the railing bracket to the machine bracket. The railing bracket, the machine attachment bracket, and the pair of linkage members together form a four-bar linkage whereby the railing may be moved between an extended position and a retracted position. The folding ladder assembly includes an upper ladder section, a lower ladder section, and first, second, and third linkage assemblies. The first linkage assembly is coupled to the upper ladder section, and includes at least a first linkage assembly linkage member. The second linkage assembly is coupled to the upper ladder section and the lower ladder section. The second linkage assembly is operable to move the lower ladder section relative to the upper ladder section. the second linkage assembly includes at least a second linkage assembly first linkage member pivotably coupled to the upper ladder section and pivotably coupled to the lower ladder section. The third linkage assembly includes at least a portion of the first linkage assembly linkage member and at least a portion of the second linkage assembly first linkage member. The assembly further includes an actuating linkage member coupled to the retractable railing assembly and to the first linkage assembly. Movement of the railing between the extended position and the retracted position results in movement of the actuating linkage member; movement of the actuating linkage member causes movement of the first linkage assembly; and movement of the first linkage assembly results in movement of the upper ladder section, the second linkage assembly, the third linkage assembly, and the lower ladder section.

In yet another aspect of the disclosure, there is provided a machine including a frame, an elevated platform coupled to the frame, a retractable railing assembly, a folding ladder assembly, and an actuating linkage member coupling the retractable railing assembly to the folding ladder assembly. The retractable railing assembly is disposed adjacent the elevated platform, and includes at least one railing, and a railing linkage assembly movably coupling the railing to the frame. The railing linkage assembly includes a machine attachment bracket coupled to the frame, a railing bracket secured to the railing, and a pair of linkage members movably coupling the railing bracket to the machine attachment bracket. The railing bracket, the machine attachment bracket, and the pair of linkage members together form a four-bar linkage whereby the railing may be moved between an extended position and a retracted position. The folding ladder assembly includes an upper ladder section, a lower ladder section, and first, second, and third linkage assemblies. The first linkage assembly is coupled to the upper ladder section and includes a platform extension pivotably coupled to the elevated platform at a platform pivot connection, and at least a first linkage assembly linkage member pivotably coupled to the frame at a linkage member pivot connection. The first linkage assembly includes a four-bar linkage including the platform extension, the upper ladder section, the first linkage assembly linkage member, and a machine link defined between the platform pivot connection and the linkage member pivot connection. The second linkage assembly is coupled to the upper ladder section and the lower ladder section, and is operable to move the lower ladder section relative to the upper ladder section. The second linkage assembly includes at least a second linkage assembly first linkage member pivotably coupled to the upper ladder section and pivotably coupled to the lower ladder section. The third linkage assembly includes at least a portion of the first linkage assembly linkage member and at least a portion of the second linkage assembly first linkage member. The machine further includes an actuating linkage member coupled to the retractable railing assembly and to the movable platform. Movement of the railing between the extended position and the retracted position results in movement of the actuating linkage member; movement of the actuating linkage member causes movement of the first linkage assembly; movement of the first linkage assembly results in movement of the upper ladder section, the second linkage assembly, the third linkage assembly, and the lower ladder section.

BRIEF DESCRIPTION OF THE DRAWING(S)

DETAILED DESCRIPTION

Figure 1:
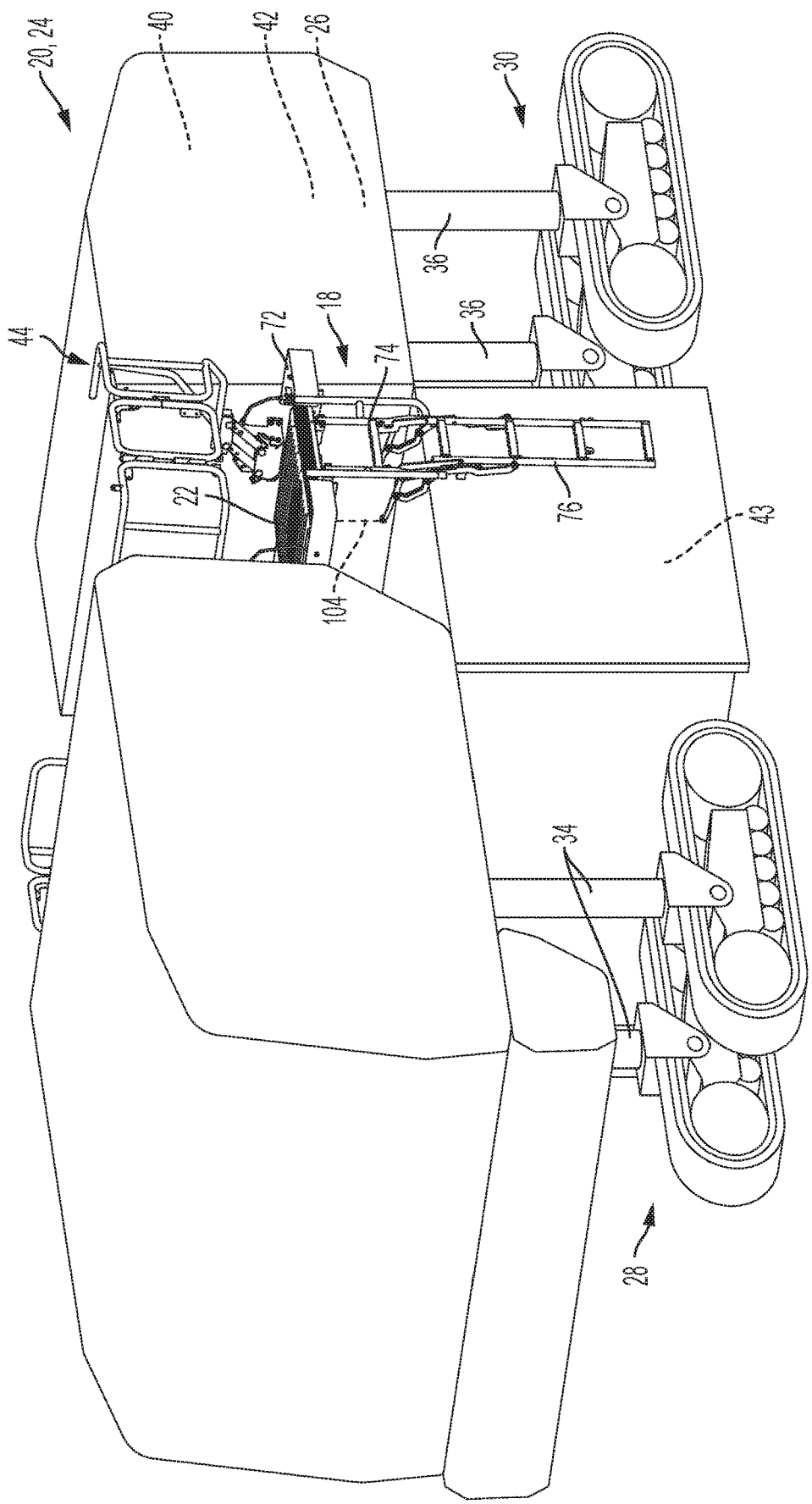
FIG. 1 illustrates a fragmentary isometric view of an exemplary mobile machine including a folding ladder assembly for accessing an elevated limited access platform, according to one embodiment of the present disclosure.

This disclosure relates to a folding ladder assembly 18 for machine 20 having an elevated platform 22 for which there is limited access. A representative machine 20 including a folding ladder assembly 18 according to this disclosure is illustrated in FIG. 1. While the arrangement is illustrated in connection with a cold planer 24, the arrangement disclosed herein has universal applicability in various other types of machines that include an elevated platform as well. The term "machine" may refer to any mobile machine that performs some type of operation associated with an industry such as mining, construction, farming, transportation, or any other industry known in the art, wherein the machine 20 includes an elevated platform 22 for which there is limited access.

The illustrated machine 20 includes a frame 26 supported on a plurality of ground engaging members 28, 30 configured for propelling the machine 20 along a surface. In the illustrated embodiment, for example, the ground engaging members 28, 30 may include a pair of front ground engaging member 28 and a pair of rear ground engaging member 30. The ground engaging members 28, 30 may each include either a wheel or a track section that is pivotable in one or more directions. The ground engaging members 28, 30 may be connected to respective lifting columns 34, 36, which may be adapted to controllably raise and lower the frame 26 relative to the associated ground engaging members 28, 30. The ground engaging members 28, 30 may include alternate or additional devices. The machine 20 may further include a driver 40, such as an engine. The ground engaging members 28, 30 may be coupled to the driver 40 by way of a drive train 42.

Those of skill in the art will appreciate that one or more implements (not illustrated) may be coupled to the frame 26. Such implements may be utilized for a variety of tasks and include, for example, milling heads, rotors, and others (identified generally as 43). For example, the machine 20 may include an implement, such as a milling head or rotor. The machine 20 may be further equipped with one or more conveyors (not illustrated) configured to transport excavated material from the implement to a discharge location, such as the bed of a dump truck (not illustrated). The implements and/or conveyors may likewise be coupled to a driver by way of a drive train.

The machine 20 further includes the elevated platform 22. For the purposes of this disclosure, it will be understood that the term "elevated platform" includes any portion of the machine 20 to which selective access is desired. The elevated platform 22 may support an operator or technician, and, for example, may be utilized to access certain control devices, readouts and gages to operate aspects of the machine 20, and/or to access certain components of the machine. The elevated platform 22 may be open, partially enclosed, or completely enclosed. It will be appreciated that, in the case of an autonomous machine, an operator may be located remotely during operation of the machine 20.

In order to introduce an extra measure of convenience and/or safety, the machine 20 may further include a railing assembly 44 proximal to the elevated platform 22. The railing assembly 44 may be coupled to the elevated platform 22 and/or other components of the machine 20. The railing assembly 44 may include a pair of railings 46, 48. The railing assembly 44 may optionally include a movable gate 50, which provides selective access to the elevated platform 22.

Figure 2:
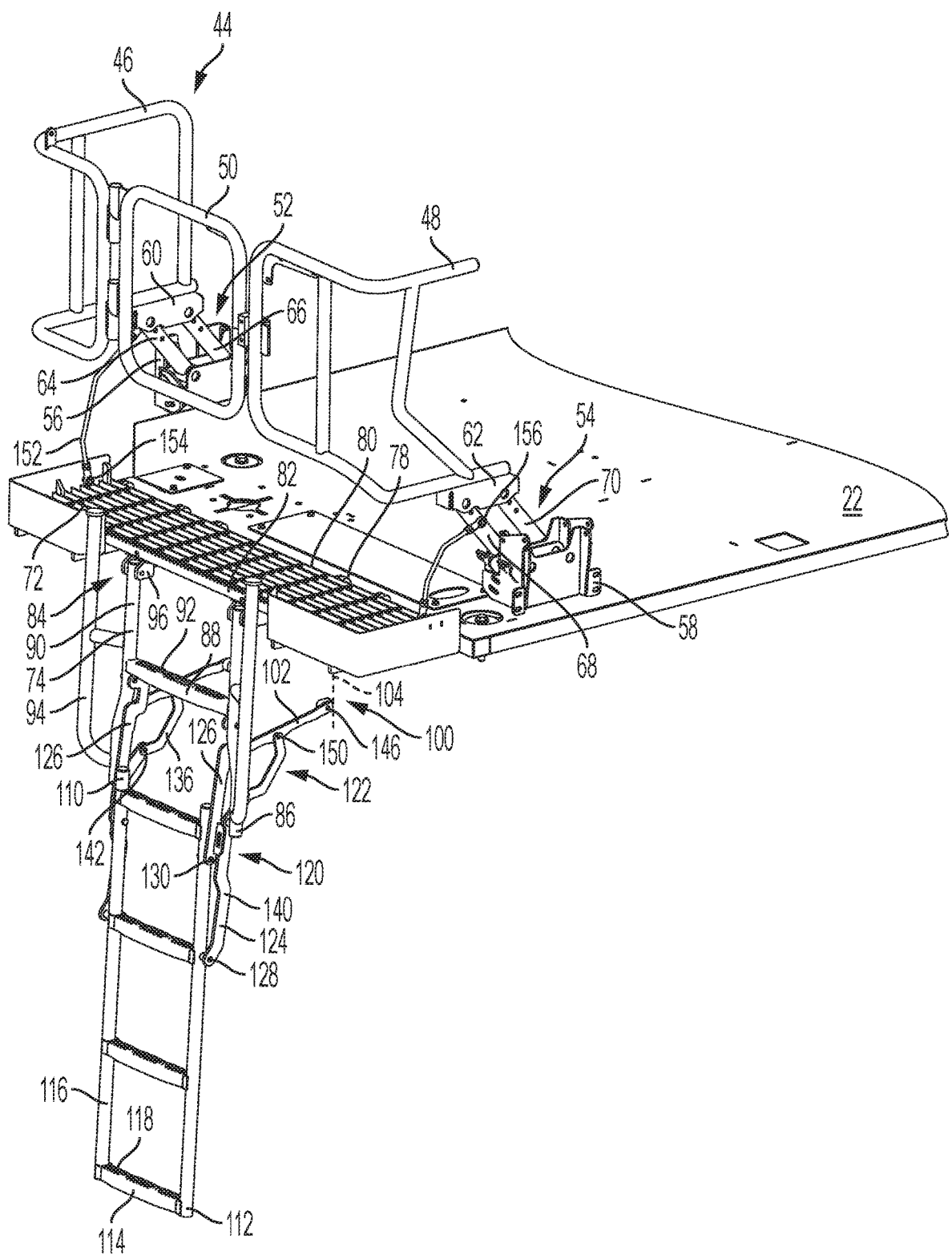
FIG. 2 is an isometric view of the folding ladder assembly and a handrail assembly with a fragmentary isometric view of the elevated platform of FIG. 1.
Figure 6:
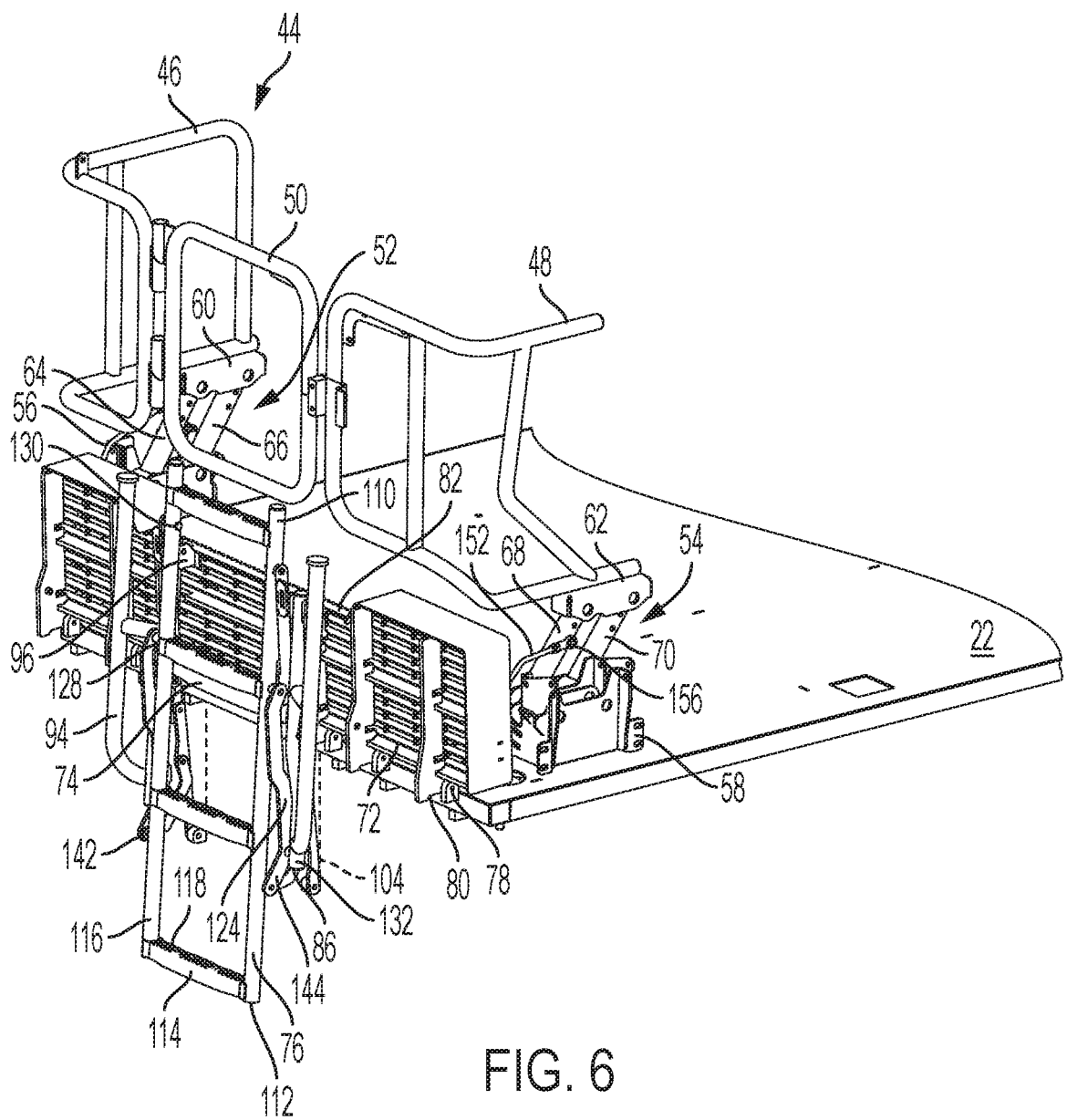
FIG. 6 is an isometric view of the folding ladder assembly and a handrail assembly with a fragmentary isometric view of the elevated platform of FIGS. 1-2 and 4-5 with the folding ladder assembly in a folded, stored position.

The railing assembly 44 may be movably mounted for selective movement between an extended position illustrated in FIGS. 1 and 2 to a retracted position illustrated in FIG. 6. While any arrangement for retraction of the railing assembly 44 may be utilized, the arrangement may be as disclosed, for example, in U.S. Pat. No. 10,286,846, which is assigned to the assignee of this disclosure.

In the illustrated railing assembly 44, the pair of railings 46, 48 are supported by respective linkage assemblies 52, 54, which are coupled to the frame 26 by appropriate structure, including, for example, respective machine attachment brackets 56, 58. The machine attachment brackets 56, 58 may be coupled to the machine 20 by any appropriate joining arrangement, including, for example, mechanical fasteners, welding, adhesive, etc.

While an alternate arrangement may be utilized, in the illustrated embodiment, the linkage assemblies 52, 54 are four-bar linkages. While the illustrated linkage assemblies 52, 54 are parallel four-bar linkages, the linkage assemblies 52, 54 may be other than parallel four-bar linkages, and may be other than four-bar linkages. The machine attachment brackets 56, 58 or the machine 20 itself forming first, stationary bars of the linkage assemblies 52, 54, respectively. Portions of the railings 46, 48 or railing brackets 60, 62 attached to the railings 46, 48 forming second, movable bars of the linkage assemblies 52, 54, respectively. Linkage members 64, 66 are pivotably coupled between railing bracket 60/railing 46 and machine attachment bracket 56 to form the third and fourth bars of linkage assembly 52, while linkage members 68, 70 are pivotably coupled between railing bracket 62/railing 48 and machine attachment bracket 58 to form the third and fourth bars of linkage assembly 54. As utilized in this disclosure, the term "linkage member" includes at least a physical link, as opposed to a pivot connection. Movement of the linkage members 64, 66, and, therefore, the railing bracket 60/railing 46 between an extended position (FIG. 2) and a retracted position (FIG. 6) may be limited, for example, by flanges provided on the machine attachment bracket 56; movement of the linkage members 68, 70, and, therefore, the railing bracket 62/railing 48 between an extended position (FIG. 2) and a retracted position (FIG. 6) may be limited, for example, by flanges provided on the machine attachment bracket 58. The railing assembly 44 may additionally include a suitable locking arrangement to maintain the folding ladder assembly 18 in an extended position or retracted position.

The folding ladder assembly 18 is disposed to provide selective access to the elevated platform 22. In accordance with teachings of this disclosure, the folding ladder assembly 18 includes an platform extension 72, an upper ladder section 74, and a lower ladder section 76 that are movably coupled for relative movement by a plurality of linkage arrangements. In at least one embodiment, the folding ladder assembly 18 may be retracted from an extended, use position, such as is illustrated in FIGS. 1 and 2, to a folded, stored position, such as illustrated in FIG. 6, by an exemplary operator located on the elevated platform 22. That is, an operator on the elevated platform 22 may cause the folding ladder assembly 18 to fold and move to a stored position without additional assistance.

The platform extension 72 is pivotably coupled to the machine 20, that is, the platform extension 72 is pivotably coupled to the machine 20 by way of a platform pivotable coupling 78 to the elevated platform 22. In the illustrated embodiment, the platform pivotable coupling 78 includes a plurality of pivotable attachments between the platform extension 72 and the elevated platform 22. The platform extension 72 is pivotably coupled to the machine 20 to move between the extended, use position, such as is illustrated in FIGS. 1 and 2, to a folded, stored position, such as illustrated in FIG. 6. The platform extension 72 extends from a proximal edge 80 substantially adjacent the platform pivotable coupling 78 to a distal edge 82. While the platform extension 72 is substantially the same width as the elevated platform 22 in the illustrated embodiment, the platform extension 72 may have an alternate width. That is, the platform extension 72 may be narrower or wider than the elevated platform 22. Further, in the illustrated embodiment, the platform extension 72 is substantially coplanar with the elevated platform 22 when disposed in the extended, use position (FIG. 6). It will be apparent to those of skill in the art, however, that the platform extension 72 is not required to be completely horizontal in the extended, use position, so long as the platform extension 72 extends laterally outward from the machine 20 and pivots upward to retract the platform extension 72.

The upper ladder section 74 is an elongate structure that includes an upper end 84 and a lower end 86. The illustrated upper ladder section 74 includes at least one horizontally-disposed step 88 that extends from an elongate portion 90, here, between elongated portions 90 disposed along either side. It will be appreciated that the upper ladder section 74 may be of any appropriate design that includes one or more such steps 88. For example, the upper ladder section 74 could include a step 88 that extends from a single elongate portion, the single elongate portion having a relatively narrow width disposed along a central section of the step 88 or a width that is substantially similar to a width of the step 88. The step 88 may include a tread 92 along an upper surface in order to enhance friction when an operator climbs the folding ladder assembly 18. The upper ladder section 74 may additionally include one or more handrails 94. In the illustrated embodiment, the upper ladder section 74 includes a pair of handrails 94 spaced from and generally parallel to the elongate portions 90. The upper ladder section 74 may be formed of any appropriate material. In the illustrated embodiment, the upper ladder section 74 is formed of a plurality of tubular structures, which may be formed of aluminum or the like in order to provide a relatively light structure.

The upper end 84 of the upper ladder section 74 is pivotably coupled to the distal edge 82 of the platform extension 72 at an upper ladder section pivotable coupling 96. In the illustrated embodiment, the upper ladder section pivotable coupling 96 includes a pair of pivotable couplings disposed at the upper ends of the pair of elongated portions 90. It will be appreciated, however, that in alternative embodiments, for example, a step of the upper ladder section 74 may be pivotably coupled to the platform extension 72, or a single or an alternate number of elongated portions may be pivotably coupled to the upper ladder section 74.

The upper ladder section 74 is further coupled to the machine 20 by a first linkage assembly 100 including first linkage assembly linkage member 102. The first linkage assembly linkage member 102 is pivotably coupled to the upper ladder section 74 at one end, and the machine 20 at the opposite end. In this way, the first linkage assembly linkage member 102, the platform extension 72, the upper ladder section 74, and a machine link 104 (shown in broken lines) formed by the machine 20 itself between the first linkage assembly linkage member 102 and the pivotable coupling 78 of the platform extension 72 to the elevated platform 22/machine 20 form the first linkage assembly 100, in this case, a first four-bar linkage. While the illustrated embodiment includes a pair of such first linkage assemblies 100, a single such first linkage assembly 100 or three or more such first linkage assemblies 100 may be provided. Further, the first linkage assembly 100 is a four-bar linkage in the illustrated embodiment, those of skill in the art will appreciate an alternate arrangement may be provided, including, for example, additional linkage members.

Figure 4:
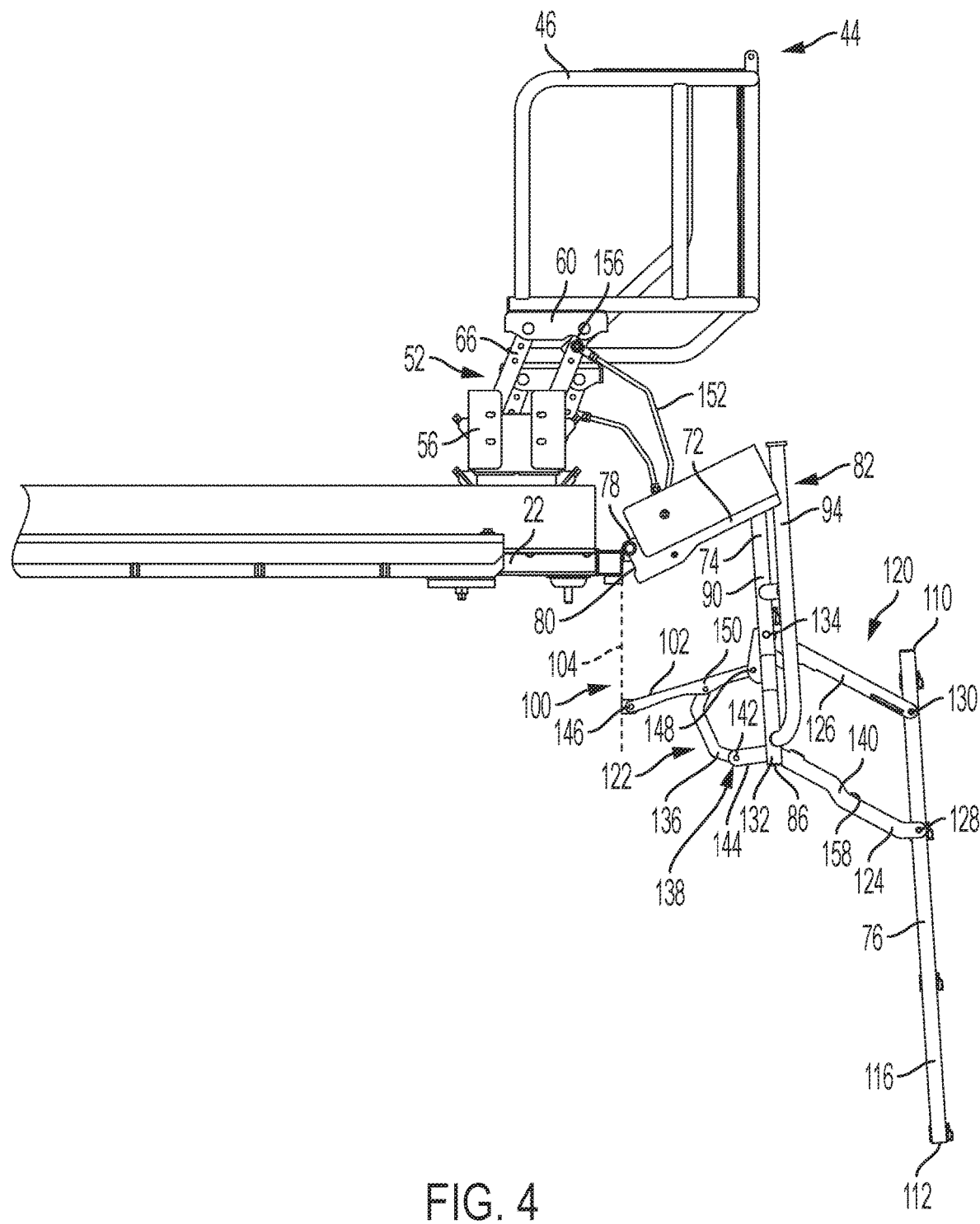
FIG. 4 is a side elevational view of the folding ladder assembly and the handrail assembly with a fragmentary side elevational view of the elevated platform of FIGS. 1-3 with the folding ladder assembly in a partially retracted position.
Figure 5:
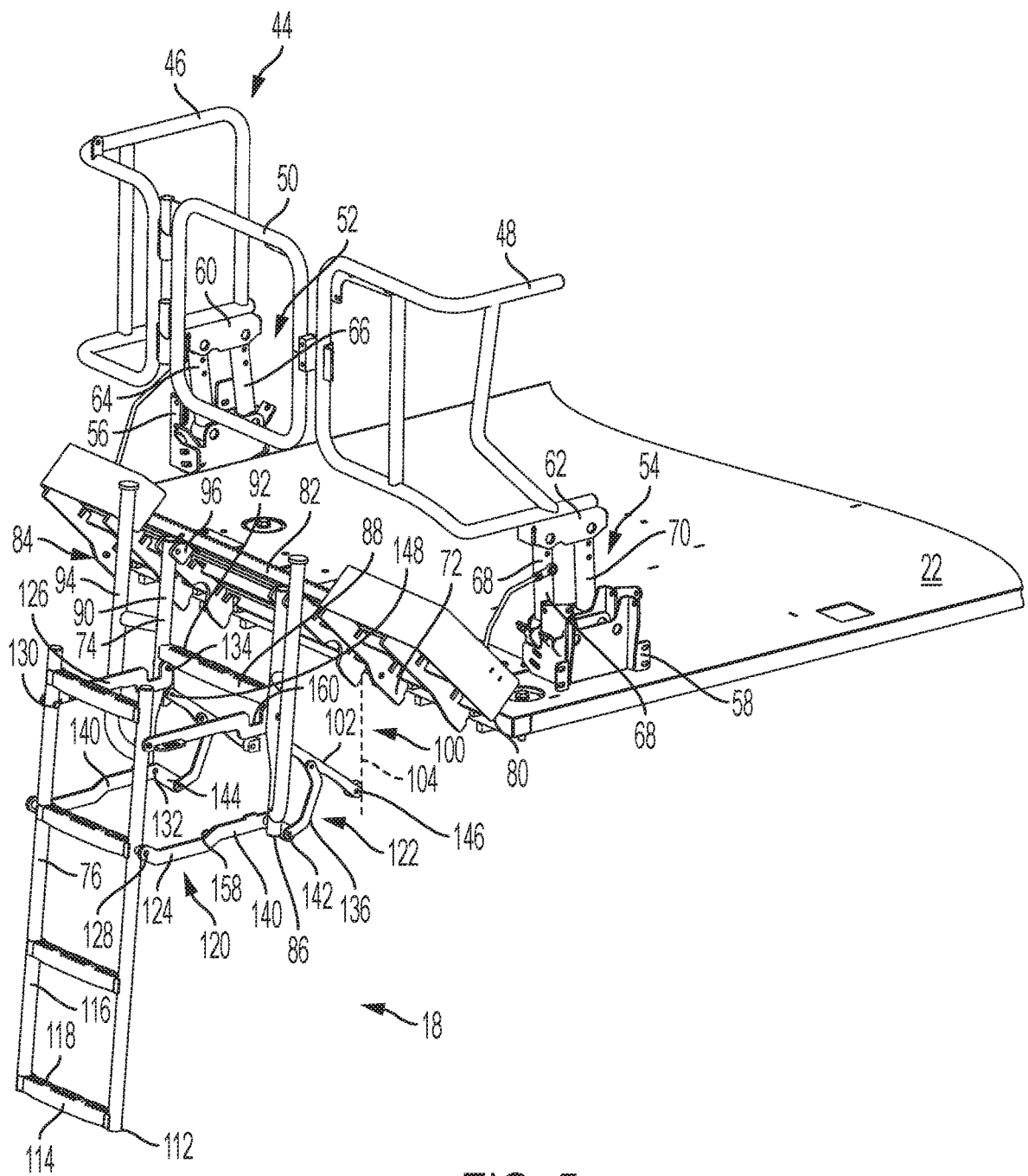
FIG. 5 is an isometric view of the folding ladder assembly and the handrail assembly with a fragmentary isometric view of the elevated platform of FIGS. 1-2 and 4 with the folding ladder assembly in a partially retracted position.

In operation, as the platform extension 72 is pivoted upward from the extended position illustrated in FIGS. 1 and 2 to an intermediate position illustrated in FIGS. 4 and 5 to the retracted position illustrated in FIG. 6, the upper ladder section 74 pivots relative to the platform extension 72. That is, the upper ladder section 74 pivots from the extended, use position illustrated in FIGS. 1 and 2 to an intermediate position illustrated in FIGS. 4 and 5 to the folded, stored position illustrated in FIG. 6, substantially adjacent a lower surface of the platform extension 72.

The lower ladder section 76 likewise is an elongate structure that includes an upper end 110 and a lower end 112. The illustrated lower ladder section 76 includes at least one horizontally-disposed step 114 that extends from an elongate portion 116, here, a plurality of steps 114 that extend between elongated portions 116 disposed along either side. It will be appreciated that the lower ladder section 76 may be of any appropriate design that includes one or more such steps 114. For example, the lower ladder section 76 could include a step 114 that extends from a single elongate portion, the single elongate portion having a relatively narrow width disposed along a central section of the step 114 or a width that is substantially similar to a width of the step 114. The step 114 may include a tread 118 along an upper surface in order to enhance friction when an operator climbs the folding ladder assembly 18. While not provided in this embodiment, the lower ladder section 76 may additionally include one or more handrails. The lower ladder section 76 may be formed of any appropriate material. In the illustrated embodiment, the lower ladder section 76 is formed of a plurality of tubular structures, which may be formed of aluminum or the like in order to provide a relatively light structure.

In the extended, use position, the upper end 110 of the lower ladder section 76 is disposed generally adjacent the lower end 86 of the upper ladder section 74, as illustrated in FIGS. 1 and 2. The lower ladder section 76 is coupled to the upper ladder section 74 and the first linkage assembly 100 by a second linkage assembly 120 by which the lower ladder section 76 may be moved between the extended, use position illustrated in FIGS. 1 and 2 to the folded position illustrated in FIG. 6. In order to transmit movement to the second linkage assembly 120 and the lower ladder section 76 when an operator causes movement to the upper ladder section 74, a third linkage assembly 122 is provided to couple the second linkage assembly 120 to the first linkage assembly 100. In the illustrated embodiment, a pair of second linkage assemblies 120 and a pair of third linkage assemblies 122 are provided. As with the first linkage assembly 100, however, a single second assembly 120 and/or a single third linkage assembly 122, or three or more of the second assembly 120 and/or a three or more of the third linkage assembly 122 may be provided in alternative embodiments.

As may best be seen in the intermediate, partially retracted folding ladder position illustrated in FIGS. 4 and 5, the second linkage assembly 120 includes a second linkage assembly first linkage member 124 and a second linkage assembly second linkage member 126, which are pivotably coupled to the lower ladder section 76 at pivot connections 128, 130, respectively. The second linkage assembly first linkage member 124 and second linkage assembly second linkage member 126, are additionally pivotably coupled to the upper ladder section 74 at pivot connections 132, 134, respectively. In this way, the illustrated second linkage assembly 120 formed by the second linkage assembly first linkage member 124 and second linkage assembly second linkage member 126 and the upper and lower ladder sections 74, 76 is a second four-bar linkage. As with the first linkage assembly 100, however, the second linkage assembly 120 may be other than a four-bar assembly.

Figure 3:
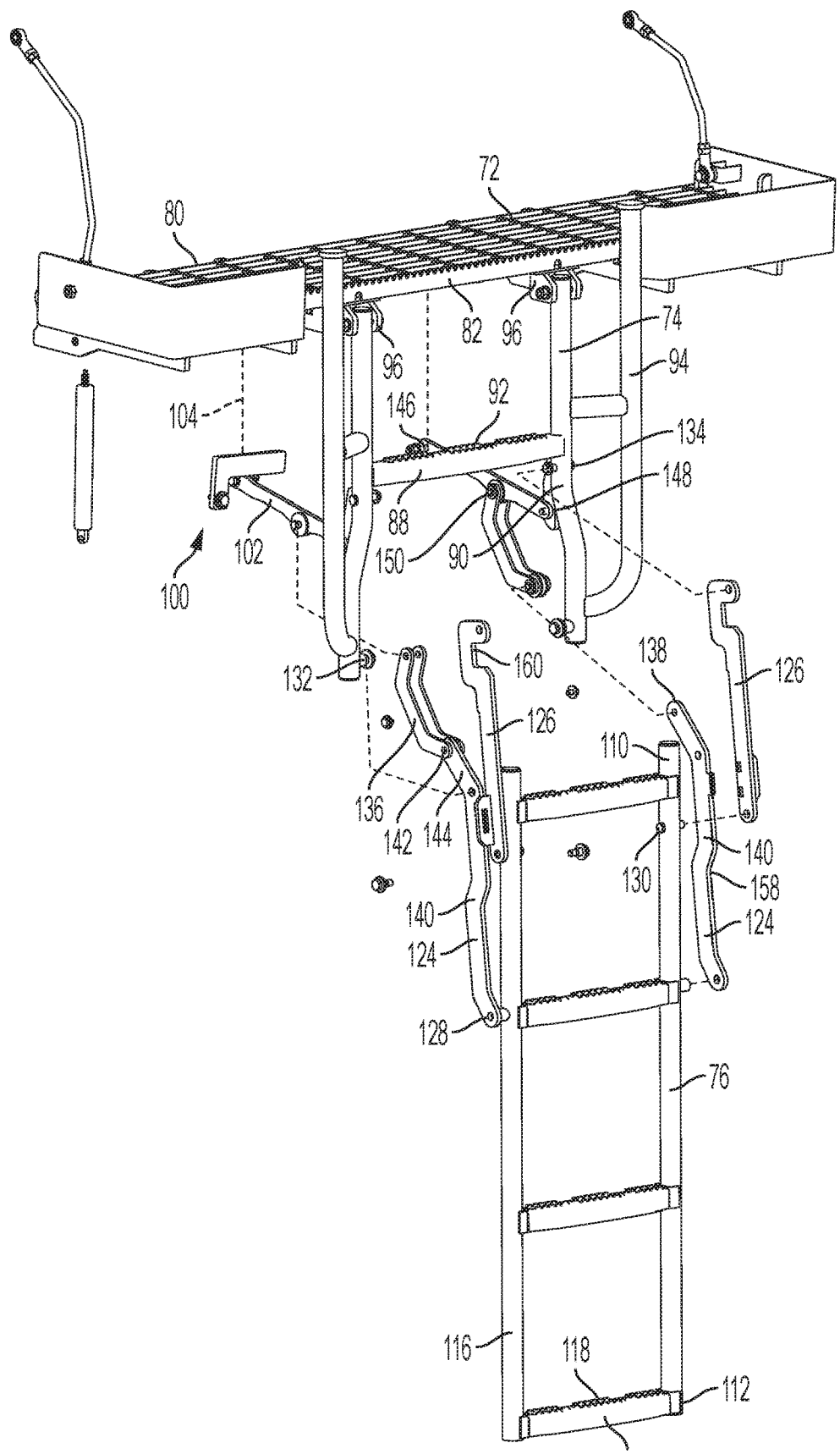
FIG. 3 is a partially exploded isometric view of the folding ladder assembly of FIGS. 1 and 2.

The third linkage assembly 122 links the first and second linkage assemblies 100, 120. The third linkage assembly 122 includes the upper ladder section 74, a third linkage assembly linkage member 136, the first linkage assembly linkage member 102 of the first linkage assembly 100, and the second linkage assembly first linkage member 124. It will be appreciated by those of skill in the art that the structure of any of the linkage members herein may include a single section (see third linkage assembly linkage member 136 as illustrated in FIGS. 2 and 4-6) or a pair of sections (see third linkage assembly linkage member 136 as illustrated in FIG. 3). Thus, the first linkage assembly linkage member 102 operates as part of both the first and third linkage assemblies 100, 122, and the second linkage assembly first linkage member 124 operates as part of both the second and third linkage assemblies 120, 122. It is this dual operation that provides the essentially simultaneous movement of the upper and lower ladder sections 74, 76.

More specifically, referring to the second linkage assembly 120, the pivot connection 132 of the second linkage assembly first linkage member 124 to the upper ladder section 74 is spaced from an end 138 of the second linkage assembly first linkage member 124 (see FIGS. 3 and 4). In this way, a first portion 140 of the second linkage assembly first linkage member 124 between the pivot connections 128, 132 acts with the second linkage assembly 120. Referring to the third linkage assembly 122, the second linkage assembly first linkage member 124 is pivotably coupled to the first linkage assembly linkage member 102 at a pivot connection 142. In the illustrated embodiment, the pivot connection 142 is disposed at or near the end 138 of the second linkage assembly first linkage member 124. Accordingly, a second portion 144 of the second linkage assembly first linkage member 124 disposed between pivot connection 132 and a pivot connection 142 is a part of the third linkage assembly 122.

Referring to the first linkage assembly 100, the first linkage assembly linkage member 102 is pivotably coupled generally at opposite ends at pivot connections 146, 148 to machine link 104 and upper ladder section 74. Referring to the third linkage assembly 122, the first linkage assembly linkage member 102 is pivotably coupled to third linkage assembly linkage member 136 at to pivot connection 150, the segment of the first linkage assembly linkage member 102 between pivot connection 150 and pivot connection 148 forming a leg of a four-bar linkage forming the third linkage assembly 122.

As a result, movement of the first linkage assembly linkage member 102 as part of the first linkage assembly 100 will cause a corresponding movement of third linkage assembly linkage member 136 part of the third linkage assembly 122. Movement of third linkage assembly linkage member 136 as part of the third linkage assembly 122 causes movement of the second linkage assembly first linkage member 124 as part of the third linkage assembly 122, resulting in movement of the second linkage assembly first linkage member 124 as part of the second linkage assembly 120. Movement of the second linkage assembly first linkage member 124 as part of the second linkage assembly 120 causes movement of the remaining legs of the second linkage assembly 120, including movement of the lower ladder section 76. It is further noted that the upper ladder section 74 forms a portion of the first linkage assembly 100 as well as the second linkage assembly 120. As a result, the movement of the upper ladder section 74 as part of the first linkage assembly 100 likewise results in movement of the second linkage assembly 120. Thus, movement of the first linkage assembly 100 results in movement of the lower ladder section 76 as part of the second linkage assembly 120 both directly by movement of the upper ladder section 74, and by way of the third linkage assembly 122 coupling to the second linkage assembly 120.

In operation, as the platform extension 72 is pivoted upward from the extended position illustrated in FIGS. 1 and 2 to an intermediate position illustrated in FIGS. 4 and 5 to the retracted position illustrated in FIG. 6, the upper ladder section 74 pivots relative to the platform extension 72. That is, the upper ladder section 74 pivots from the extended, use position illustrated in FIGS. 1 and 2 to an intermediate position illustrated in FIGS. 4 and 5 to the folded, stored position illustrated in FIG. 6, substantially adjacent a lower surface of the platform extension 72.

Movement of the first linkage assembly 100 may be provided by any appropriate mechanism. For example, an actuating force may be provided by a linkage member 152 pivotably coupled to the platform extension 72 at pivot connection 154 to cause the platform extension 72 to pivot at platform pivotable coupling 78. This pivoting movement of the platform extension 72 causes movement of the upper ladder section 74 and first linkage assembly linkage member 102 as part of the first linkage assembly 100, which causes corresponding movement of the second and third linkage assemblies. While two such actuating linkage members 152 are shown in the illustrated embodiment, it will be appreciated that other embodiments may include only one such actuating linkage member 152, or three or more actuating linkage members 152.

Movement may likewise be provided to the actuating linkage member 152 by any appropriate actuating arrangement. For example, in the illustrated embodiment, the actuating linkage members 152 at either side of the platform extension 72 are pivotably coupled to the railing assembly 44 by way of pivotable couplings 156 to linkage assemblies 52, 54. More specifically, actuating linkage members 152 are pivotably coupled to linkage members 64, 68. As a result, movement of the railing assembly 44 between the extended and retracted positions results in movement of the actuating linkage members 152, which further results in movement of the first linkage assembly 100 and corresponding movement of the folding ladder assembly 18 between the extended, use position and the folded, stored position. As with the actuating linkage members 152, it will be appreciated that other embodiments may include only one such actuation by only one actuating arrangement, or three or more actuating arrangements. Those of skill in the art will likewise appreciate that the actuating force may be applied to the first linkage assembly 100 from an automatic or other mechanical arrangement. As a result, the operation of the folding ladder assemble 18 may be automated, as may be desirable in an autonomous machine.

It will be appreciated that the components of the first, second, and third linkage assemblies may include contours that permit the upper and lower ladder sections 74, 76 to be disposed with the upper end 110 of the lower ladder section 76 to be disposed proximal to the upper end 84 of the upper ladder section 74, and the lower end 112 of the lower ladder section 76 to be disposed proximal to the lower end 86 of the upper ladder section 74. By way of example only, the second linkage assembly first linkage member 124 may include an offset 158 and the second linkage assembly second linkage member 126 may include an offset 160, each of which accommodates a step 88 of the upper ladder section 74 when the folding ladder assembly 18 is in the folded, stored position illustrated in FIG. 6.

INDUSTRIAL APPLICABILITY

The present disclosure is applicable to machines 20 that include an elevated platform 22, whether open, partially enclosed, or enclosed. The disclosed folding ladder assembly 18 may be utilized to provide selective access to the elevated platform 22.

Embodiments of the disclosed folding ladder assembly 18 allow a single operator located on the elevated platform 22 to cause the folding ladder 18 to move between the extended, use position and the folded, stored position. Some embodiments may allow for automatic operation of the folding ladder assembly 18. In some embodiments, operation of the folding ladder assembly 18 may be coupled to operation of a retractable railing assembly 44 such that movement of the retractable railing assembly 44 would cause movement of the folding ladder assembly 18 between an extended, use position, and the folded stored position.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

While the foregoing description provides examples of the disclosed system and technique, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A folding ladder assembly adapted to be coupled to a machine, the folding ladder assembly comprising:
   an upper ladder section,
   a lower ladder section,
   a first linkage assembly coupled to the upper ladder section and adapted to be coupled to the machine, the first linkage assembly including at least a first linkage assembly linkage member,
   a second linkage assembly coupled to the upper ladder section and the lower ladder section, the second linkage assembly being operable to move the lower ladder section relative to the upper ladder section, the second linkage assembly including at least a second linkage assembly first linkage member pivotably coupled to the upper ladder section and pivotably coupled to the lower ladder section, and
   a third linkage assembly, the third linkage assembly including at least a portion of the first linkage assembly linkage member and at least a portion of the second linkage assembly first linkage member,
   whereby movement of the first linkage assembly results in movement of the upper ladder section, the second linkage assembly, the third linkage assembly, and the lower ladder section.

2. The folding ladder assembly of claim 1 wherein the first linkage assembly includes a platform extension having a proximal edge adapted to be pivotably coupled to the machine, the platform extension further having a distal edge adapted to be pivotably coupled to the upper ladder section.

3. The folding ladder assembly of claim 1 wherein the second linkage assembly further includes a second linkage assembly second linkage member pivotably coupled to the upper ladder section and pivotably coupled to the lower ladder section, the second linkage assembly being a four-bar linkage formed by the upper ladder section, the second linkage assembly first linkage member, the lower ladder section, and the second linkage assembly second linkage member.

4. The folding ladder assembly of claim 1 wherein the third linkage assembly further includes the third linkage assembly linkage member, the third linkage assembly linkage member being pivotably coupled to the first linkage assembly linkage member and the second linkage assembly first linkage member.

5. The folding ladder assembly of claim 4 wherein the third linkage assembly further includes at least a portion of the upper ladder section, the third linkage assembly being a four-bar linkage that includes the at least a portion of the first linkage assembly linkage member, the third linkage assembly linkage member, the at least a portion of the second linkage assembly first linkage member, and the at least a portion of the upper ladder section.

6. The folding ladder assembly of claim 4 wherein the first linkage assembly linkage member is adapted to be pivotably coupled to the machine at a first end of the first linkage assembly linkage member, the first linkage assembly linkage member is pivotably coupled to the upper ladder section at a second, opposite end of the first linkage assembly linkage member, and the third linkage assembly linkage member is pivotably to the first linkage assembly linkage member at a location between the first end and the second, opposite end of the first linkage assembly linkage member.

7. The folding ladder assembly of claim 4 wherein the second linkage assembly first linkage member has a first end, and a second, opposite end, the first end of the second linkage assembly first linkage member is pivotably coupled to the lower ladder section, the second, opposite end of the second linkage assembly first linkage member is pivotably coupled to the third linkage assembly linkage member, and the second linkage assembly first linkage member is pivotably to the upper ladder section at a location between the first end and the second, opposite end of the second linkage assembly first linkage member.

8. The folding ladder assembly of claim 1 wherein the first linkage assembly includes a platform extension having a proximal edge adapted to be pivotably coupled to the machine, the platform extension further having a distal edge adapted to be pivotably coupled to the upper ladder section, the first linkage assembly being a four-bar linkage when the platform extension is pivotably coupled to the machine and to the upper ladder section, the second linkage assembly being a four-bar linkage, and the third linkage assembly being a four-bar linkage.

9. The folding ladder assembly of claim 1 including at least a pair of first linkage assembly linkage members, at least a pair of second linkage assemblies, and a pair of third linkage assemblies.

10. A retractable railing assembly and a folding ladder assembly adapted to be coupled to a machine, the retractable railing assembly and the folding ladder assembly comprising:
   a retractable railing assembly including
      at least one railing,
      a railing linkage assembly adapted to movably couple the railing to the machine, the railing linkage assembly including a machine attachment bracket adapted to be coupled to the machine, a railing bracket secured to the railing, and a pair of linkage members movably coupling the railing bracket to the machine bracket, the railing bracket, the machine attachment bracket, and the pair of linkage members together forming a four-bar linkage whereby the railing may be moved between an extended position and a retracted position;
   a folding ladder assembly including
      an upper ladder section,
      a lower ladder section,
      a first linkage assembly coupled to the upper ladder section and adapted to be coupled to the machine, the first linkage assembly including at least a first linkage assembly linkage member,
      a second linkage assembly coupled to the upper ladder section and the lower ladder section, the second linkage assembly being operable to move the lower ladder section relative to the upper ladder section, the second linkage assembly including at least a second linkage assembly first linkage member pivotably coupled to the upper ladder section and pivotably coupled to the lower ladder section, and
      a third linkage assembly, the third linkage assembly including at least a portion of the first linkage assembly linkage member and at least a portion of the second linkage assembly first linkage member, and
   an actuating linkage member coupled to the retractable railing assembly and to the first linkage assembly whereby movement of the railing between the extended position and the retracted position results in movement of the actuating linkage member, movement of the actuating linkage member causing movement of the first linkage assembly, and movement of the first linkage assembly resulting in movement of the upper ladder section, the second linkage assembly, the third linkage assembly, and the lower ladder section.

11. The retractable railing assembly and folding ladder assembly of claim 10 wherein the first linkage assembly includes a platform extension having a proximal edge adapted to be pivotably coupled to the machine, the platform extension further having a distal edge pivotably coupled to the upper ladder section, the actuating linkage member being coupled to the platform extension, whereby movement of the actuating linkage member results in movement of the platform extension.

12. The retractable railing assembly and folding ladder assembly of claim 10 wherein the second linkage assembly further includes a second linkage assembly second linkage member pivotably coupled to the upper ladder section and pivotably coupled to the lower ladder section, the second linkage assembly being a four-bar linkage formed by the upper ladder section, the second linkage assembly first linkage member, the lower ladder section, and the second linkage assembly second linkage member.

13. The retractable railing assembly and folding ladder assembly of claim 10 wherein the third linkage assembly further includes the third linkage assembly linkage member, the third linkage assembly linkage member being pivotably coupled to the first linkage assembly linkage member and the second linkage assembly first linkage member.

14. The retractable railing assembly and folding ladder assembly of claim 13 wherein the third linkage assembly further includes at least a portion of the upper ladder section, the third linkage assembly being a four-bar linkage that includes the at least a portion of the first linkage assembly linkage member, the third linkage assembly linkage member, the at least a portion of the second linkage assembly first linkage member, and the at least a portion of the upper ladder section.

15. The retractable railing assembly and folding ladder assembly of claim 13 wherein the first linkage assembly linkage member is adapted to be pivotably coupled to the machine at a first end of the first linkage assembly linkage member, the first linkage assembly linkage member is pivotably coupled to the upper ladder section at a second, opposite end of the first linkage assembly linkage member, and the third linkage assembly linkage member is pivotably to the first linkage assembly linkage member at a location between the first end and the second, opposite end of the first linkage assembly linkage member.

16. The retractable railing assembly and folding ladder assembly of claim 13 wherein the second linkage assembly first linkage member has a first end, and a second, opposite end, the first end of the second linkage assembly first linkage member is pivotably coupled to the lower ladder section, the second, opposite end of the second linkage assembly first linkage member is pivotably coupled to the third linkage assembly linkage member, and the second linkage assembly first linkage member is pivotably to the upper ladder section at a location between the first end and the second, opposite end of the second linkage assembly first linkage member.

17. The retractable railing assembly and folding ladder assembly of claim 10 wherein the first linkage assembly includes a platform extension having a proximal edge pivotably adapted to be pivotably coupled to the machine, the platform extension further having a distal edge pivotably coupled to the upper ladder section, the first linkage assembly being a four-bar linkage, the second linkage assembly being a four-bar linkage, and the third linkage assembly being a four-bar linkage.

18. The retractable railing assembly and folding ladder assembly of claim 10 including at least a pair of first linkage assembly linkage members, at least a pair of second linkage assemblies, and a pair of third linkage assemblies.

19. The retractable railing assembly and folding ladder assembly of claim 10 including a pair of actuating linkage members, the retractable railing assembly including a pair of railings and a pair of linkage assemblies, the pair of actuating linkage members be coupled to the pair of railing linkage assemblies, respectively.

20. A machine comprising:
a frame;
an elevated platform coupled to the frame;
a retractable railing assembly disposed adjacent the elevated platform, the retractable railing assembly including
  at least one railing,
  a railing linkage assembly movably coupling the railing to the frame, the railing linkage assembly including a machine attachment bracket coupled to the machine, a railing bracket secured to the railing, and a pair of linkage members movably coupling the railing bracket to the machine attachment bracket, the railing bracket, the machine attachment bracket, and the pair of linkage members together forming a four-bar linkage whereby the railing may be moved between an extended position and a retracted position;
a folding ladder assembly including
  an upper ladder section,
  a lower ladder section,
  a first linkage assembly coupled to the upper ladder section, the first linkage assembly including a platform extension pivotably coupled to the elevated platform at a platform pivot connection, and at least a first linkage assembly linkage member pivotably coupled to the frame at a linkage member pivot connection, the first linkage assembly including a four-bar linkage including the platform extension, the upper ladder section, the first linkage assembly linkage member, and a machine link defined between the platform pivot connection and the linkage member pivot connection,
  a second linkage assembly coupled to the upper ladder section and the lower ladder section, the second linkage assembly being operable to move the lower ladder section relative to the upper ladder section, the second linkage assembly including at least a second linkage assembly first linkage member pivotably coupled to the upper ladder section and pivotably coupled to the lower ladder section, and
  a third linkage assembly, the third linkage assembly including at least a portion of the first linkage assembly linkage member and at least a portion of the second linkage assembly first linkage member, and
an actuating linkage member coupled to the retractable railing assembly and to the movable platform,
whereby movement of the railing between the extended position and the retracted position results in movement of the actuating linkage member, movement of the actuating linkage member causing movement of the first linkage assembly, movement of the first linkage assembly resulting in movement of the upper ladder section, the second linkage assembly, the third linkage assembly, and the lower ladder section.

\* \* \* \* \*